United States Patent
Metzler

[11] Patent Number: 6,129,246
[45] Date of Patent: Oct. 10, 2000

[54] ROTARY FEEDER FOR DOSING BULK MATERIAL

[75] Inventor: Eugen Metzler, Ebenweiler, Germany

[73] Assignee: Waeschle GmbH, Weingarten, Germany

[21] Appl. No.: 09/138,432

[22] Filed: Aug. 24, 1998

[30] Foreign Application Priority Data

Sep. 1, 1997 [DE] Germany .................. 197 38 122

[51] Int. Cl.[7] ................................................. G01F 11/10
[52] U.S. Cl. ................... 222/368; 222/189.11; 277/350; 277/408; 277/432
[58] Field of Search ................ 222/368, 189.11; 414/219; 277/348, 350, 408, 431, 432

[56] References Cited

U.S. PATENT DOCUMENTS

| | | | |
|---|---|---|---|
| 3,151,784 | 10/1964 | Tailor | 222/368 |
| 3,260,420 | 7/1966 | Barker et al. | 222/368 X |
| 4,475,735 | 10/1984 | Smuda et al. | 277/350 |
| 4,722,663 | 2/1988 | Swearingen | 277/432 X |
| 4,915,265 | 4/1990 | Heep et al. | 222/368 |
| 5,392,964 | 2/1995 | Stapp et al. | 222/368 |
| 5,722,671 | 3/1998 | Nosowicz et al. | 277/408 |
| 5,865,441 | 2/1999 | Orlowski | 277/408 X |

FOREIGN PATENT DOCUMENTS

| | | |
|---|---|---|
| 0 586 728 | 3/1994 | European Pat. Off. . |
| 33 39 061 | 5/1984 | Germany . |
| 35 21 194 | 12/1986 | Germany . |
| 37 42 522 | 11/1988 | Germany . |
| 37 42 521 C1 | 4/1989 | Germany . |
| 279 374 A3 | 6/1990 | Germany . |
| 40 19 627 A1 | 1/1992 | Germany . |
| 42 44 655 A1 | 11/1993 | Germany . |
| 43 38 631 A1 | 5/1994 | Germany . |

*Primary Examiner*—Henry J. Recla
*Assistant Examiner*—Kathleen J. Prunner
*Attorney, Agent, or Firm*—Henry M. Feiereisen

[57] ABSTRACT

A rotary feeder for dosing bulk material, includes a casing having an inner chamber and formed with a top inlet, a bottom outlet and spaced-apart bearing covers flanking the inlet and the outlet. A rotor is accommodated in the chamber and is mounted on a shaft for rotation about a pivot axis. The shaft supports a plurality of vanes extending radially outward from the shaft between lateral end disks, with the shaft being supported on opposite sides of the rotor by bearings. In order to minimize the length of the shaft and a flexure of the shaft when encountering a substantial pressure differential between the inlet and the outlet, the chamber of the housing is sealed from the ambient environment by at least one shaft seal situated axially outwardly from the one bearing of the first and second bearings which is located on a same side of the rotor as the shaft seal.

12 Claims, 8 Drawing Sheets

ROTARY FEEDER FOR DOSING BULK MATERIAL

BACKGROUND OF THE INVENTION

The present invention relates to gates in general, and in particular to a rotary feeder for dosing flowable (bulk) material.

A rotary feeder includes a housing formed with a top inlet and a bottom outlet which are spaced apart from one another by an internal chamber. Accommodated in the chamber is a rotor supported on a shaft for rotation about a pivot axis. The shaft is rotatably journalled in spaced-apart side covers and carries a plurality of radially extending vanes between spaced-apart end disks. Shaft seals are provided for sealing the internal chamber of the housing from the ambient environment. When the shaft is driven, batches of flowable material entering through the inlet are advanced in the cells between neighboring vanes and discharged through the outlet.

A rotary feeder of this type is disclosed in German pat. No. 37 42 521 C1 and describes the provision of a complicated seal arrangement in order for this conventional rotary feeder to operate at high pressure differentials between the inlet and the outlet. The bearings for the rotor shaft are located at the outside in the side covers and are protected against penetration of, in particular, dusty particles in a direction toward the internal chamber by a plurality of seal shafts fitted on the shaft. This type of rotary feeder displays comparably wide dimensions so that the rotor shaft is either caused to sag at high pressure differentials, thereby enlarging the normal operational play on one side and diminishing the normal operational play on the other side, or is of such massive design in order to give it a necessary rigidity. Clearly, a massive design of the rotor shaft complicates manufacture and thus is cost-intensive, while a sagging of the rotor shaft inevitably leads to an increased friction and thus heating in the peripheral area of the rotor as well as in the area of the shaft and shaft seals.

SUMMARY OF THE INVENTION

It is thus an object of the present invention to provide an improved rotary feeder, obviating the afore-stated drawbacks.

In particular, it is an object of the present invention to provide an improved rotary feeder which is simple in design and yet reliable in operation.

These objects, and others which will become apparent hereinafter, are attained in accordance with the present invention by sealing the internal chamber of the housing from the ambient environment through provision of at least one shaft seal situated axially outwardly from the one bearing of the first and second bearings which is located on a same side of the rotor as the shaft seal.

Through the provision of at least one shaft seal at a location beyond the corresponding bearing, the overall length of the rotor shaft is reduced so that the shaft becomes more rigid and the problems associated with conventional rotary feeders are eliminated or at least substantially diminished. The dimensions of the shaft seal, which absorbs the pressure differential between the inner chamber and the ambient environment, are secondary in conjunction with a sagging of the shaft. A rotary feeder according to the present invention can thus be equipped with a less complicated seal arrangement between the peripheral surface of the rotor and the adjacent inner wall surface of the housing and/or operated without any problems at high pressure differentials. As the rotor shaft is normally extended out of the housing only on one side for operative connection to a motor, it is sufficient in this case to provide the shaft seal only on the side of the rotor shaft that communicates with the ambient environment. Naturally, the shaft seal should be so designed as to be capable to withstand an occurring pressure differential. The portion of the shaft that traverses the side cover and is extended beyond the corresponding bearing is not subject to such a bending stress. Thus, this shaft portion needs only to be configured for transmission of the torque and can normally be made of significantly smaller diameter whereby the shaft seal sits in the area of the smaller shaft diameter. Also, compared to conventional rotary feeders, the moment of friction and the frictional heat is smaller in a rotary feeder of the present invention. Moreover, the frictional heat is also generated at a relatively great distance from the rotor.

A further advantage of positioning the shaft seal radially outwards from the corresponding bearing, resides in the fact that the width of the shaft seal does not impact in any way on the supported length of the shaft between the bearings so that shaft seals of any type may be utilized. Thus, realization of the required strength to withstand a pressure differential does not pose any problems.

The novel and improved rotary feeder may further include a fitting for admission of barrier fluid into the area of the bearing located on a same side of the rotor as the shaft seal, if there is a risk that flowable material may penetrate into the bearing. Suitably, the barrier fluid may be a barrier gas or a barrier liquid, if necessary also a lubricant.

Instead of or in addition to the use of a fitting for admission of barrier fluid, the improved rotary feeder may include a further shaft seal which is arranged between at least one of the end disks and the corresponding bearing on the same side of the rotor as the end disk. This shaft seal can be designed of relatively slight strength even when the encountered differential pressure is high between the internal chamber of the housing and the ambient environment because the shaft seal disposed radially outwards of the associated bearing absorbs, possibly supported by a supply of barrier gas, the major part of the differential pressure.

In particular, if there is a risk that the fluid admitted through the fitting carries lubricant out of the bearing and into the internal chamber, e.g. during starting or shutdown of the rotary feeder, the improved and novel rotary feeder may include a second fitting for admission of barrier gas at least into the space between one of the end disks and the side cover situated on the same side of the rotor as the end disk.

The fitting for admitting barrier fluid and the fitting for admitting barrier gas may be supplied from a common barrier gas source; However, it may be suitable to link the two fittings via a filter because a reversal of the flow direction of the fluid, e.g. in the first fitting, in particular during start, during shutdown or during a malfunction of the rotary feeder or transport operation, will not cause for example lubricant to migrate from the bearing into the rotor chamber via the barrier fluid fitting, the common connection to the barrier gas source and the fitting for admitting barrier gas into the chamber of the rotary feeder.

It is certainly within the scope of the present invention to supply the fittings for admission of barrier fluid and barrier gas from different sources whereby the barrier fluid fitting and the barrier gas fitting are fluidly connected via a medium-separating pressure equalizing device. The pressure equalizing device may be a piston which is slideably guided within a cylinder, or a surge tank subdivided by an elastic membrane, or a surge tank subdivided by an elastic bubble.

As stated above, the novel and improved rotary feeder according to the present invention permits the provision of almost any kind of shaft seal of sufficient strength to withstand pressure differentials. Thus, it is also possible to configure the shaft seal located axially outwards from its corresponding bearing as a mechanical seal whereby a further fitting is provided for admission of barrier fluid into the mechanical seal. Suitably, the barrier fluid is a liquid medium typically used for such mechanical seals.

According to another feature of the present invention, the seal arrangement of the improved and novel rotary feeder may include at least two shaft seals at a location axially outwards from the associated bearing on the same side of the rotor as the shaft seals, with a further fitting being provided for admission of barrier gas under pressure into an area between the two shaft seals to incrementally drop the pressure, e.g. in equal pressure stages, inside the inner chamber of the housing to the level of ambient pressure. Thus, both shaft seals need only be designed for half the differential pressure.

In order to improve the protection of the bearing or bearings and, if provided, the respective shaft seal between the bearing and the corresponding end disk on the same side of the rotor against penetration of flowable particles, the novel and improved rotary feeder may be provided with a sealing ring arrangement which is located in an annular gap between the peripheral surface of each end disk and the adjacent inner wall surface of the housing. There are various solutions known to the skilled artisan in this field for designing a suitable type of sealing ring.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Throughout all the Figures, same or corresponding elements are generally indicated by same reference numerals.

Figure 1:
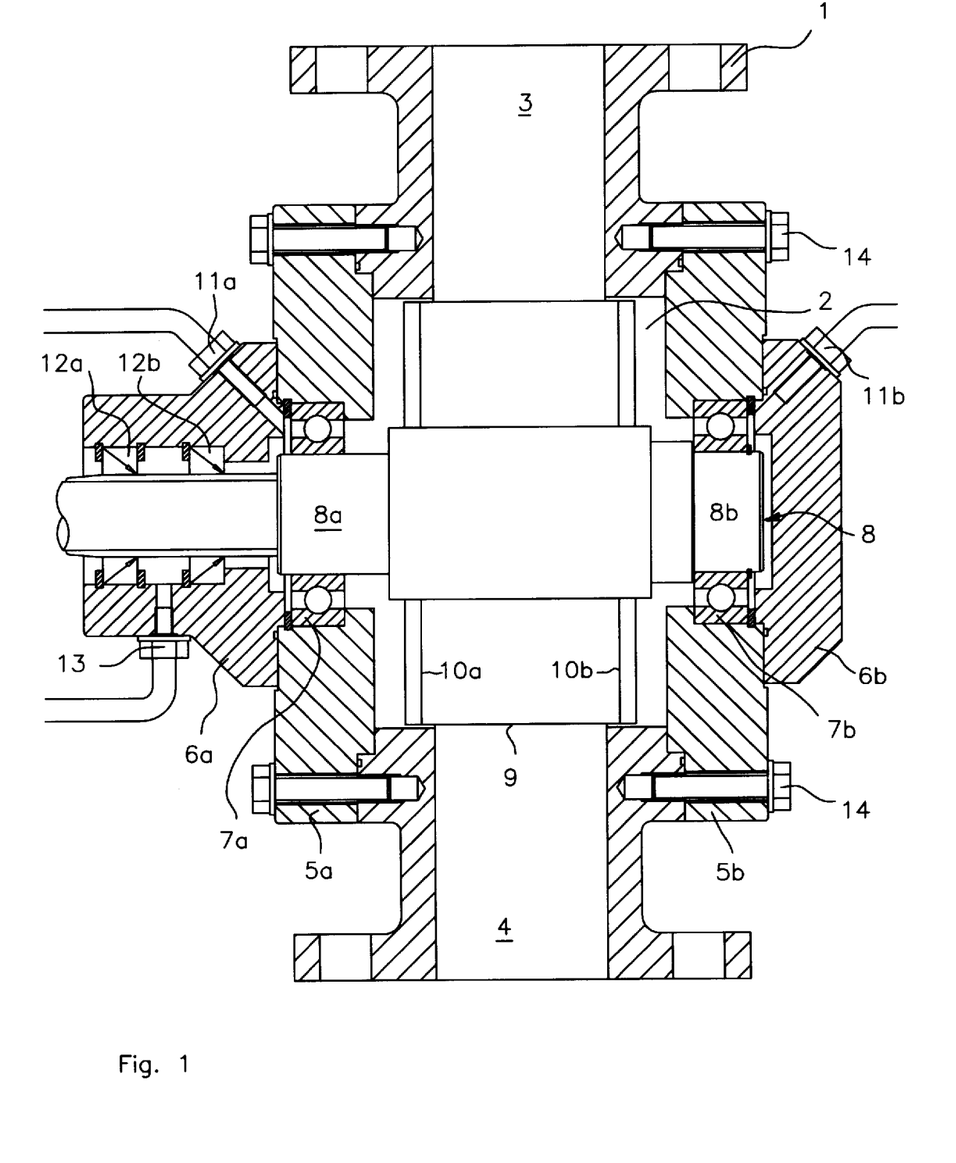
FIG. 1 is a fragmentary, longitudinal section of a first embodiment of a rotary feeder according to the present invention.

Turning now to the drawing, and in particular to FIG. 1, there is shown a fragmentary, longitudinal section of a first embodiment of a rotary feeder according to the present invention, including a housing 1 having a top inlet 3, a bottom outlet 4 and a substantially cylindrical inner chamber 2 between the inlet 3 and the outlet 4. The housing 1 is closed on opposite sides by side covers 5*a*, 5*b* and bearing covers 6*a*, 6*b* which are fitted onto the side covers 5*a*, 5*b*, with the side covers 5*a*, 5*b* being mounted to the housing 1 by bolts 14. Accommodated in the chamber 2 is a rotor which includes a shaft 8 and a plurality of radial vanes 9 which are secured to the shaft 8 and extend radially outwards between spaced-apart end disks 10*a*,10*b* affixed to the shaft 8 for conjoint movement therewith. The tips of the vane 9 move along the cylindrical inside wall surface of the housing 2, with each pair of vanes 9 bounding with the inside wall surface of the housing 1 and the end disks 10*a*, 10*b* a compartment for advancing a batch of flowable (bulk) material from the inlet 3 to the outlet 4.

The shaft 8 of the rotor has two coaxial stubs 8*a*, 8*b* which are journalled in bearings 7*a*, 7*b* housed in the side covers 5*a*, 5*b*, whereby the bearings 7*a*, 7*b* are positioned in the side covers 5*a*, 5*b* in close proximity to the end disks 10*a*, 10*b* in order to keep the length of shaft 8 in the area between the bearings 7*a*, 7*b* as short as possible. Thus, a sagging of the shaft 8 can be kept to a minimum even when encountering substantial pressure differentials between the inlet 3 and/or the outlet 4 and/or the ambient environment.

Each of bearing covers 6*a*, 6*b* has formed therein a fitting 11*a*, 11*b* for admission of a barrier fluid into the area of the bearing 7*a* and the area of the bearing 7*b*. The shaft 8 has mounted thereon two shaft seals 12*a*, 12*b* situated at a location which is axially outwards from the bearing 7*a*, as viewed from the inner chamber 2, with a further fitting 13 extending in the bearing cover 6*a* between the two shaft seals 12*a*, 12*b* for admission of a barrier fluid such as barrier gas. Fluid, typically a gas, is admitted via the fittings 11*a*, 11*b* into the bearings 7*a*, 7*b*, at a pressure which is substantially equal to the highest pressure in the rotary feeder, while barrier gas may be admitted via the fitting 13 into the area of the shaft seals 12*a*, 12*b* at a pressure which is about half of the pressure differential between the inner chamber 2 and the ambient atmosphere. In this case, the shaft seals 12*a*, 12*b* are exposed to only half of the entire differential pressure.

Figure 2:
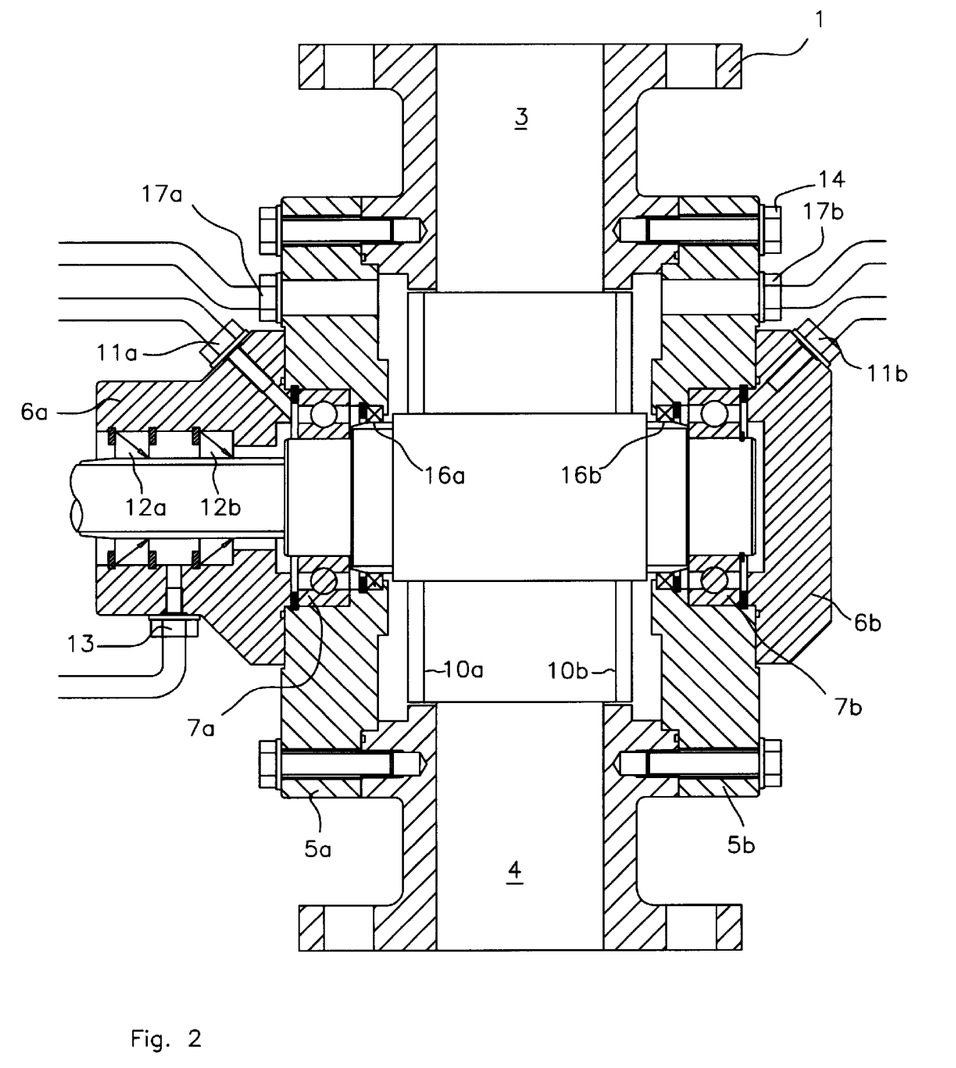
FIG. 2 is a fragmentary, longitudinal section of a second embodiment of a rotary feeder according to the present invention.

Turning now to FIG. 2, there is shown a fragmentary, longitudinal section of a second embodiment of a rotary feeder according to the present invention, which differs from the rotary feeder of FIG. 1 in the provision of an additional shaft seal 16*a* mounted on one side of the rotor on the shaft 8 in an area between the inner chamber 2 and the bearing 7*a*, and an additional shaft seal 16*b* mounted on the other side of the rotor on the shaft 8 in an area between the inner chamber 2 and the bearing 7*b*. Furthermore, the inner chamber 2 is connected on each side to a fitting 17*a*, 17*b* for admission of barrier gas. The pressure of admitted barrier gas may slightly exceed the pressure of barrier fluid, e.g. a liquid, in particular lubricant, being supplied via the fittings 11*a*, 11*b* to the bearings 7*a*, 7*b*. The additional shaft seals 16*a*, 16*b* may be designed of a very slender configuration as they are exposed to only a slight differential pressure.

It will be appreciated by persons skilled in the art that the use of the term "barrier fluid" or "barrier gas" in the description will denote any suitable means which interferes, inhibits, prevents or terminates the migration, movement or the like, of a medium or material beyond an intended boundary, and may be selected from any material, compound, composition which, under the process conditions, maintains some integrity as a barrier.

Figure 3:
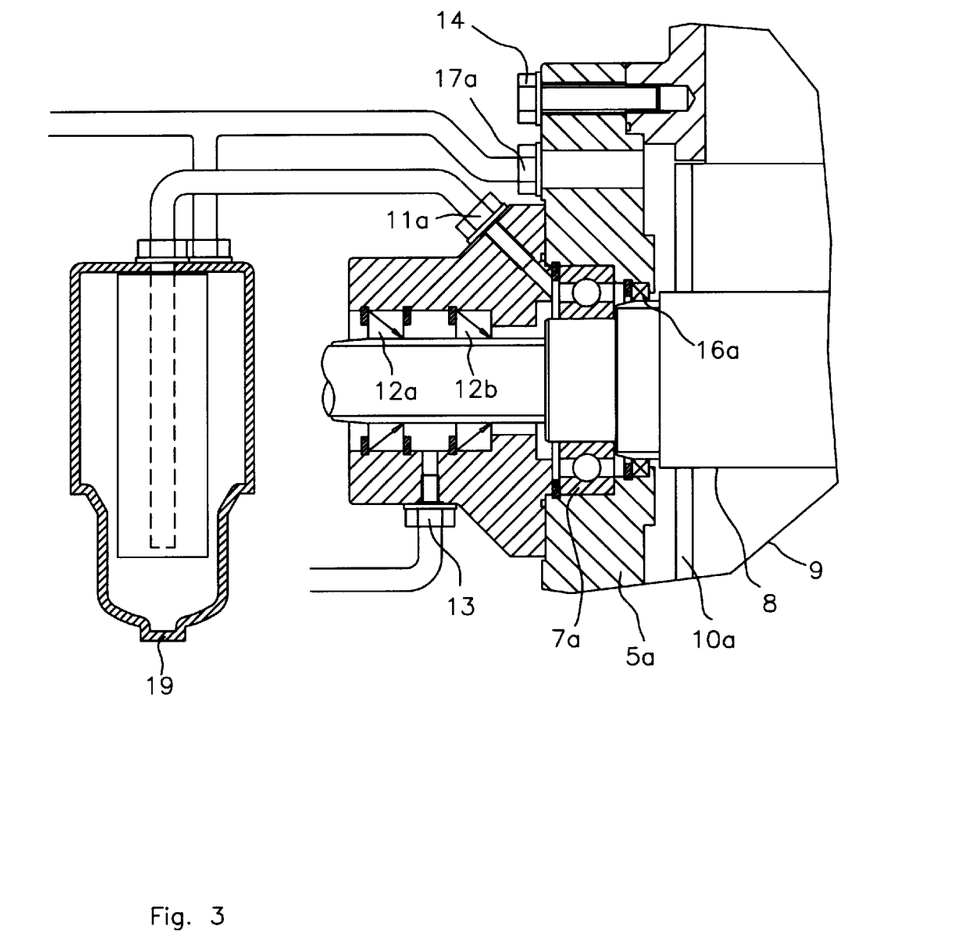
FIG. 3 is a fragmentary, longitudinal section of a modification of the rotary feeder of FIG. 2.

FIG. 3 shows a modification of the rotary feeder of FIG. 2, whereby the fittings 11*a* and 17*a* (as well as the fittings 11*b* and 17*b* which are mirror images of the fittings 11*a*, 17*a* but not shown in FIG. 3) are respectively supplied with barrier gas from a same source and connected to one another via a filter 19 shown only schematically. Through the provision of the filter 19, lubricant or bulk material particles are prevented from migrating from one of the fittings 11a, 17a into the other one of the fittings 11a, 17a when the flow direction in one or both fittings 11a, 17a is inadvertently reversed.

Figure 4:
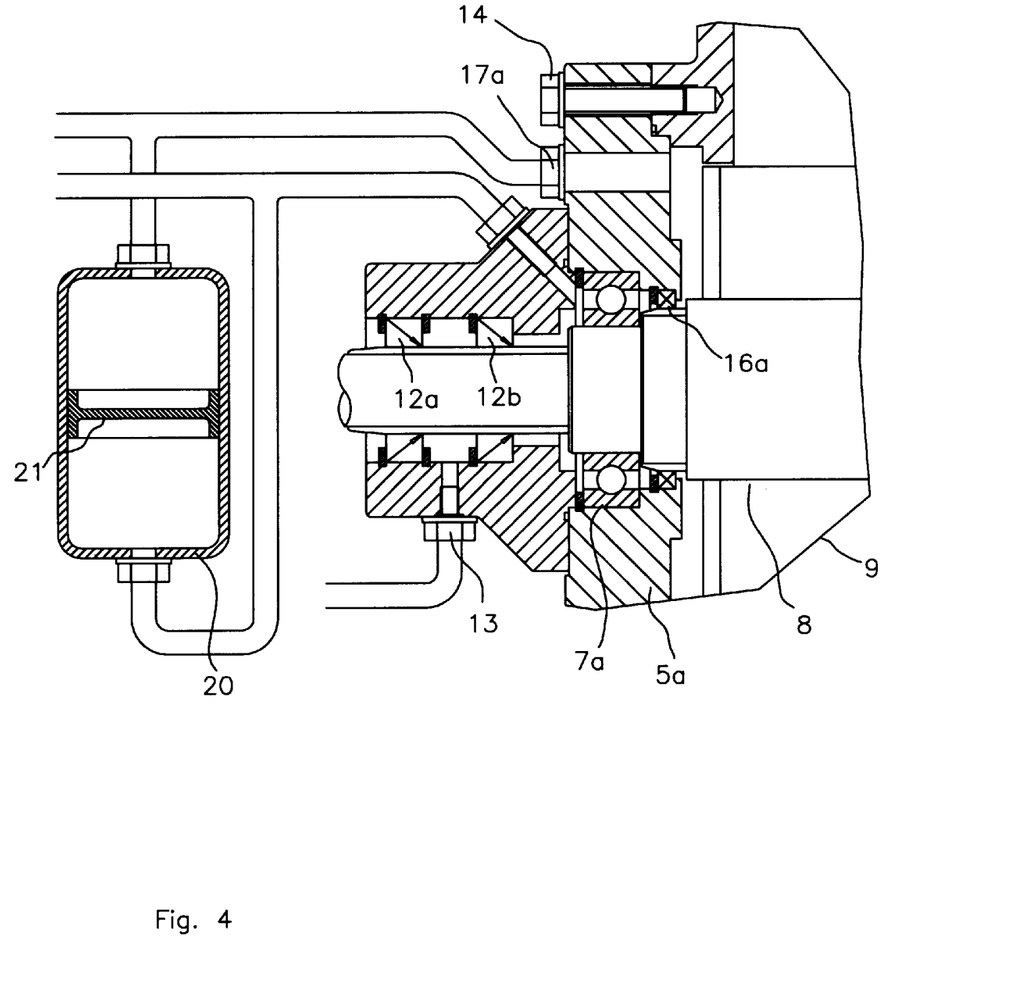
FIGS. 4 to 6 show fragmentary, longitudinal sections of further modifications of the rotary feeder of FIG. 2.
Figure 5:
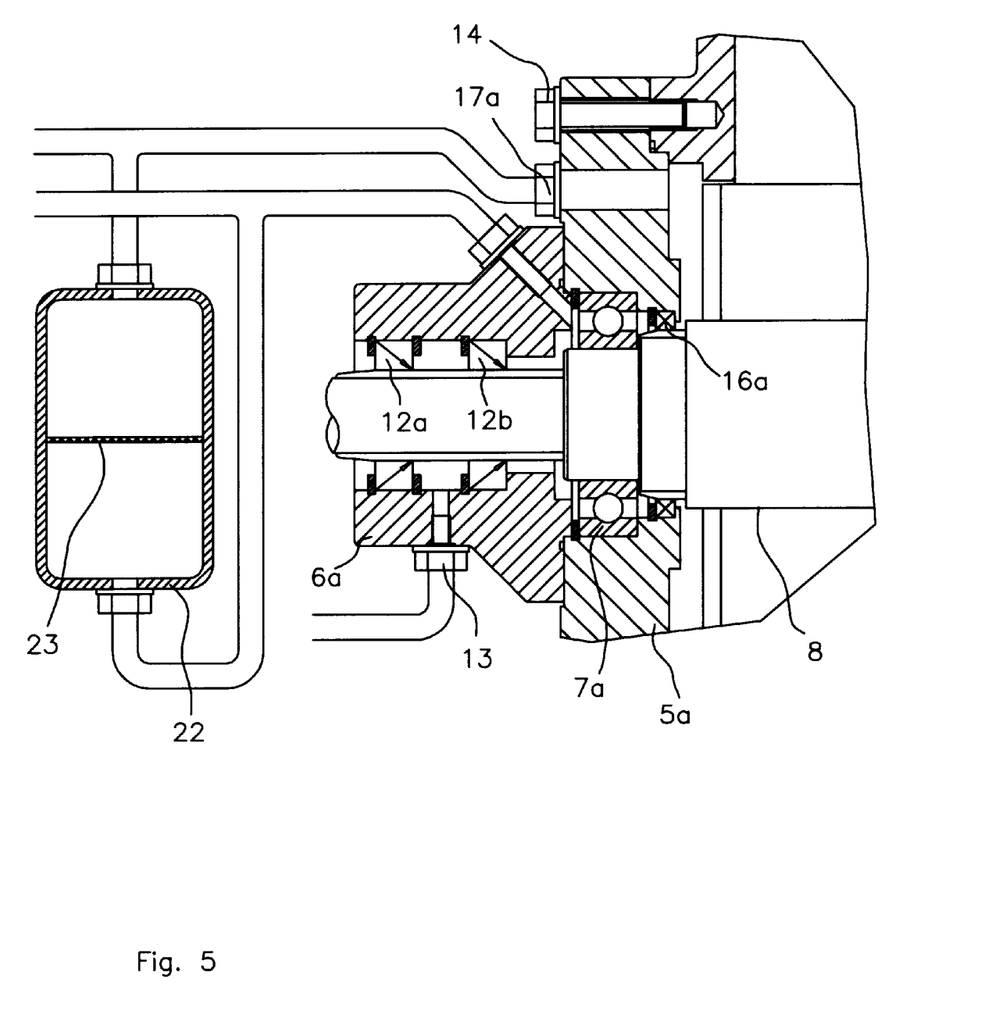
Figure 6:
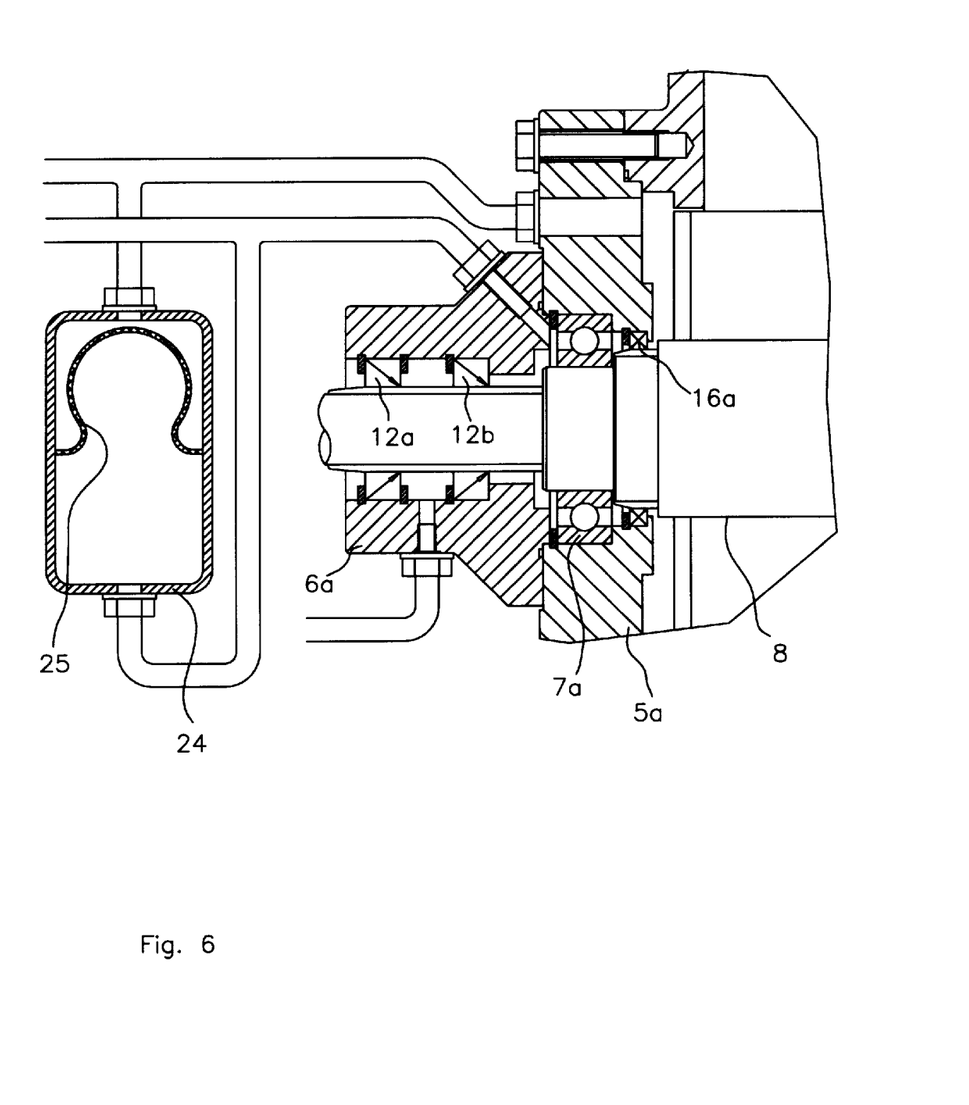

When for example the bearing 7a is not supplied with a barrier gas but with another barrier means, e.g. a lubricant, the filter 19 is replaced by a pressure transmitting and fluid-separating device, such as a surge tank 20, shown in FIG. 4 and including a piston 21 which is slidingly guided in the surge tank 20, or a surge tank 22 having mounted therein an elastic membrane 23, as shown in FIG. 5, or a surge tank 24 having secured therein a flexible bubble 25, as shown in FIG. 6.

Figure 7:
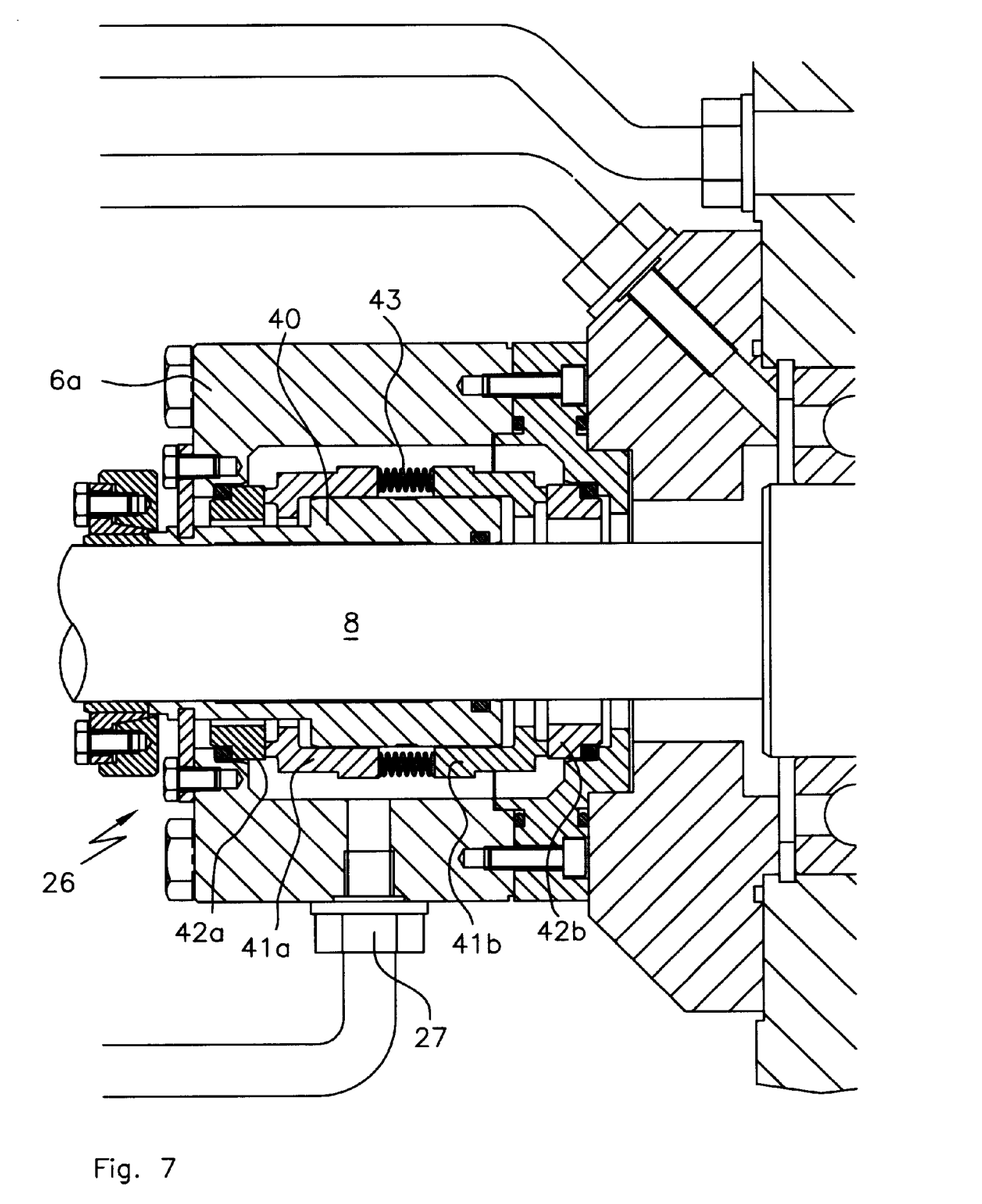
FIG. 7 is a longitudinal section, on an enlarged scale, of the rotary feeder of FIG. 2, showing in detail one embodiment of a shaft seal arrangement.

Referring now to FIG. 7, there is shown a longitudinal section, on an enlarged scale, of the rotary feeder of FIG. 2, showing in detail one embodiment of a shaft seal arrangement, generally designated by reference numeral 26 for sealing the shaft 8 along the portion extending axially outwardly of the housing 1. The shaft seal arrangement 26 is formed by a mechanical seal which is supplied by lubricant via a fitting 27 received in the bearing cover 6a. The mechanical seal 26 includes essentially a base 40, which is fixedly secured to the shaft 8 for conjoint movement therewith, and two sliding rings 41a, 41b which are axially movable and securely fixed to the base 40 for conjoint movement therewith, with the sliding rings 41a, 41b being pressed by springs 43 against complementary stationary seal rings 42a, 42b which are secured in place in the bearing cover 6a.

Figure 8:
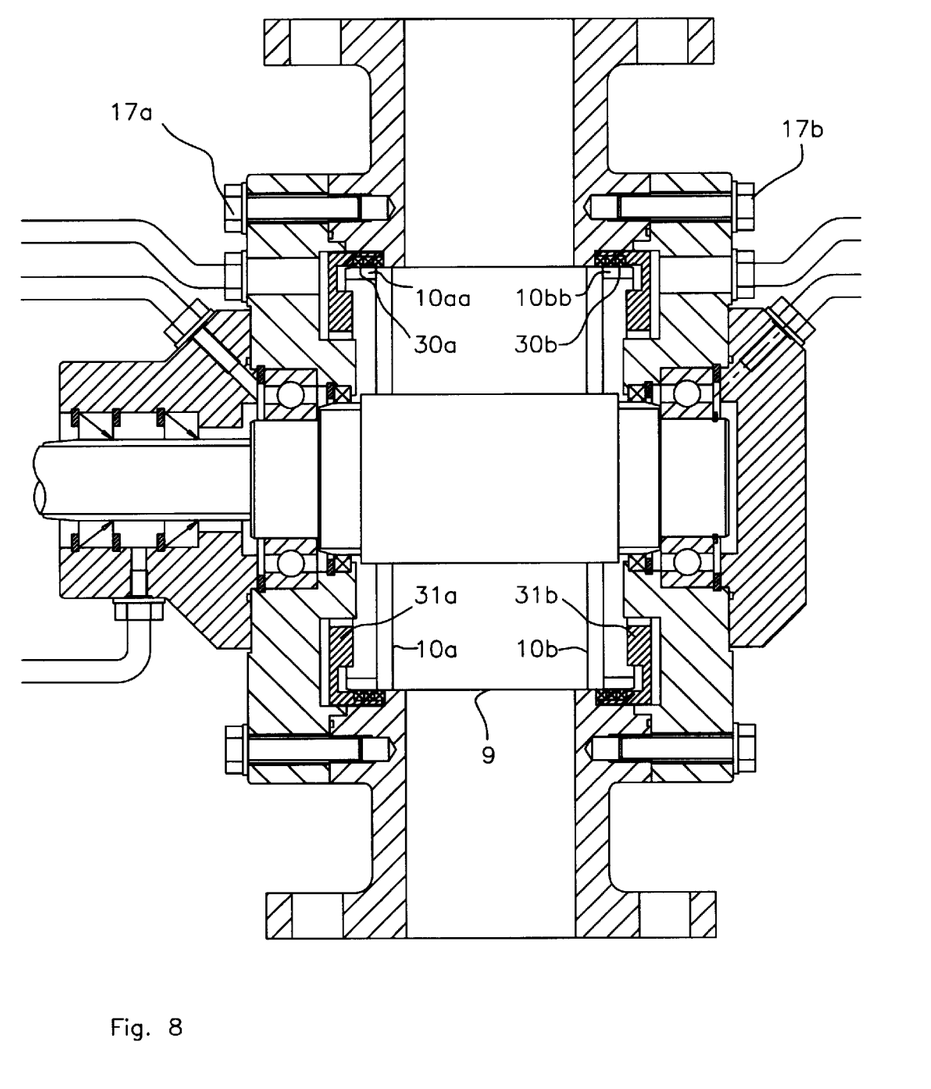
FIG. 8 is a fragmentary, longitudinal section of a third embodiment of a rotary feeder according to the present invention.

Referring now to FIG. 8, there is shown a fragmentary, longitudinal section of a third embodiment of a rotary feeder according to the present invention. As shown in FIG. 8, the end disks 10a, 10b have peripheral surfaces 10aa, 10bb which are extended in an axial direction and spaced from the inside wall surface of the housing 1 for accommodating several sealing rings 30a, 30b which are compressed by stationary pressure disks 31a, 31b in axial direction so as to expand in a radial direction and thereby form a packed, pressure-tight joint in the form of a stuffing box. The pressure disks 31a, 31b are pressurized by a barrier fluid, preferably barrier gas, admitted via fittings 17a, 17b.

While the invention has been illustrated and described as embodied in a rotary feeder for dosing flowable material, it is not intended to be limited to the details shown since various modifications and structural changes may be made without departing in any way from the spirit of the present invention.

What is claimed as new and desired to be protected by Letters Patent is set forth in the appended claims:

1. A rotary feeder for dosing bulk material, comprising:
   a housing having a top inlet, a bottom outlet, a chamber between the inlet and the outlet, and spaced-apart bearing covers flanking the inlet and the outlet;
   a rotor accommodated in the chamber and mounted on a shaft for rotation about a pivot axis, said shaft supporting a plurality of vanes extending radially outwards from the shaft between lateral end disks;
   bearing means for supporting the shaft on opposite sides of the rotor, said bearing means including a first bearing for supporting the shaft on one side of the rotor and a second bearing for supporting the shaft on the other side of the rotor; and
   a sealing arrangement for sealing the chamber of the housing from the ambient environment, said sealing arrangement including at least one shaft seal situated axially outwardly from the one bearing of the first and second bearings which is located on a same side of the rotor as the shaft seal; and
   a first fitting for admitting a barrier fluid into an area of the one bearing, a second fitting for admitting a barrier gas into a space between one of the lateral disks and a corresponding one of the side covers which is located on a same side of the rotor as the one end disk, and a filter, said first fitting being fluidly connected to the second fitting via the filter.

2. The rotary feeder of claim 1 wherein the sealing arrangement includes at least one further shaft seal positioned between one of the lateral disks and a corresponding one of the first and second bearings which is located on a same side of the rotor as the one end disk.

3. The rotary feeder of claim 1 wherein the shaft seal is a mechanical seal, and further comprising a fitting for admitting barrier fluid into the mechanical seal.

4. The rotary feeder of claim 1 wherein the seal arrangement includes two shaft seals situated axially outwardly from the one bearing of the first and second bearings, and further comprising a fitting for admitting a barrier gas into the space between the two shaft seals.

5. The rotary feeder of claim 1 wherein the housing has an inner wall surface and each of the end disks is defined by a peripheral surface which is spaced from the inner wall surface of the housing for defining an annular gap, and further comprising a second annular seal arrangement received in the annular gap between the peripheral surface of the lateral disks and the inner wall surface of the housing.

6. A rotary feeder for dosing bulk material, comprising:
   a housing having a top inlet, a bottom outlet, a chamber between the inlet and the outlet, and spaced-apart bearing covers flanking the inlet and the outlet;
   a rotor accommodated in the chamber and mounted on a shaft for rotation about a pivot axis, said shaft supporting a plurality of vanes extending radially outwards from the shaft between lateral end disks;
   bearing means for supporting the shaft on opposite sides of the rotor, said bearing means including a first bearing for supporting the shaft on one side of the rotor and a second bearing for supporting the shaft on the other side of the rotor;
   a sealing arrangement for sealing the chamber of the housing from the ambient environment, said sealing arrangement including at least one shaft seal situated axially outwardly from the one bearing of the first and second bearings which is located on a same side of the rotor as the shaft seal; and
   a first fitting for admitting a barrier fluid into an area of the one bearing, a second fitting for admitting a barrier gas into a space between one of the lateral disks and a corresponding one of the side covers which is located on a same side of the rotor as the one end disk, and a pressure equalizing device, said first and second fittings being connected to separate sources and linked to one another via the pressure equalizing device.

7. The rotary feeder of claim 6 wherein the pressure equalizing device is formed by a cylinder and a piston slideably guided in the cylinder.

8. The rotary feeder of claim 6 wherein the pressure equalizing device is formed by a surge tank and an elastic membrane situated in and subdividing the surge tank.

9. The rotary feeder of claim 6 wherein the pressure equalizing device is formed by a surge tank and a flexible bubble situated in and subdividing the surge tank.

10. The rotary feeder of claim 6 wherein the shaft seal is a mechanical seal, and further comprising a fitting for admitting barrier fluid into the mechanical seal.

11. The rotary feeder of claim 6 wherein the seal arrangement includes two shaft seals situated axially outwardly from the one bearing of the first and second bearings, and further comprising a fitting for admitting a barrier gas into the space between the two shaft seals.

12. The rotary feeder of claim 6 wherein the housing has an inner wall surface and each of the end disks is defined by a peripheral surface which is spaced from the inner wall surface of the housing for defining an annular gap, and further comprising a second annular seal arrangement received in the annular gap between the peripheral surface of the lateral disks and the inner wall surface of the housing.

* * * * *